(12) United States Patent
Begeja et al.

(10) Patent No.: US 9,769,545 B2
(45) Date of Patent: *Sep. 19, 2017

(54) SYSTEM AND METHOD FOR AUTOMATICALLY AUTHORING INTERACTIVE TELEVISION CONTENT

(71) Applicant: AT&T Intellectual Property II, L.P., Atlanta, GA (US)

(72) Inventors: Lee Begeja, Gillette, NJ (US); David Crawford Gibbon, Lincroft, NJ (US); Zhu Liu, Marlboro, NJ (US); Bernard Simon Renger, New Providence, NJ (US); Behzad Shahraray, Freehold, NJ (US); Mitchell J. Weinraub, Englewood, CO (US); Stephanie A. Morrison, Mendham, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 12 days.

This patent is subject to a terminal disclaimer.

(21) Appl. No.: 15/188,682

(22) Filed: Jun. 21, 2016

(65) Prior Publication Data

US 2016/0301989 A1 Oct. 13, 2016

Related U.S. Application Data

(63) Continuation of application No. 14/679,265, filed on Apr. 6, 2015, now Pat. No. 9,462,355, which is a
(Continued)

(51) Int. Cl.
*H04N 21/8545* (2011.01)
*G11B 27/034* (2006.01)
(Continued)

(52) U.S. Cl.
CPC ....... *H04N 21/8545* (2013.01); *G11B 27/034* (2013.01); *G11B 27/28* (2013.01);
(Continued)

(58) Field of Classification Search
None
See application file for complete search history.

(56) References Cited

U.S. PATENT DOCUMENTS 6,195,655 B1   2/2001   Lawler
6,233,575 B1   5/2001   Agrawal et al.
(Continued)

OTHER PUBLICATIONS

"Media Analysis Plug-Ins for VideoLogger" DataSheet, Virage, (2002). 2 pgs.
(Continued)

*Primary Examiner* — Omar S Parra (57) ABSTRACT

A system and method is provided to automatically generate content for ITV products and services by processing primary media sources. In one embodiment of the invention, keywords are automatically extracted from the primary media sources using one or more of a variety of techniques directed to video, audio and/or textual content of the multimodal source. In some embodiments, keywords are then processed according to one or more disclosed algorithms to narrow the quantity of downstream processing that is necessary to associate secondary sources (reference items) with the primary video source. Embodiments of the invention also provide automatic searching methods for the identification of reference items based on the processed keywords in order to maximize the value added by the association of reference items to the video source.

20 Claims, 6 Drawing Sheets

Related U.S. Application Data continuation of application No. 14/171,276, filed on Feb. 3, 2014, now Pat. No. 9,032,443, which is a continuation of application No. 13/270,059, filed on Oct. 10, 2011, now Pat. No. 8,646,006, which is a continuation of application No. 10/329,753, filed on Dec. 27, 2002, now Pat. No. 8,037,496.

(51) Int. Cl.

| | | |
|---|---|---|
| G11B 27/28 | (2006.01) | |
| H04N 21/233 | (2011.01) | |
| H04N 21/234 | (2011.01) | |
| H04N 21/235 | (2011.01) | |
| H04N 21/4722 | (2011.01) | |
| H04N 21/858 | (2011.01) | |

(52) U.S. Cl.
CPC ......... *H04N 21/233* (2013.01); *H04N 21/235* (2013.01); *H04N 21/23418* (2013.01); *H04N 21/4722* (2013.01); *H04N 21/858* (2013.01)

(56) References Cited

U.S. PATENT DOCUMENTS

| | | | |
|---|---|---|---|
| 6,496,981 B1 | 12/2002 | Wistendahl et al. | |
| 6,513,036 B2 | 1/2003 | Gruensgaard et al. | |
| 7,209,942 B1 * | 4/2007 | Hori ................. | G06F 17/30035 707/999.001 |
| 8,037,496 B1 | 10/2011 | Begeja et al. | |
| 8,646,006 B2 | 2/2014 | Begeja | |
| 2001/0003214 A1 | 6/2001 | Shastri et al. | |
| 2002/0072895 A1 | 6/2002 | Imanaka et al. | |
| 2002/0099685 A1 * | 7/2002 | Takano ............. | G06F 17/30011 |
| 2002/0108128 A1 | 8/2002 | Lash et al. | |
| 2002/0144293 A1 * | 10/2002 | Dimitrova ......... | G06F 17/30017 725/133 |
| 2003/0117428 A1 | 6/2003 | Li et al. | |
| 2005/0172318 A1 * | 8/2005 | Dudkiewicz ...... | G06F 17/30017 725/46 |
| 2007/0214417 A1 | 9/2007 | Toyarna et al. | |
| 2008/0052739 A1 * | 2/2008 | Logan ............... | A23L 2/52 725/25 |

OTHER PUBLICATIONS

"Open TV Publisher Debuts in Australia", 2002 Press Release, http://www.opentv.com/company/news/pressreleases/2002/02262002b.html; Nov. 19, 2002, 2 pgs.

"Storyteller", Watchpoint Media, Inc., 4 pgs. "TV URI Schemes." TVWEB-URI-Requirements-Nov. 1, 1998 [online] [retrieved on Dec. 18, 2002] retrieved form the Internet ,URL:http:www.w3org/TV/TVWeb-URL-Requirements-19981110>.

"Television and the Web," W3C Interaction Domain<URL: http:/222.23.org/TV/>.

Karl Paulsen, "Serving Up ITV, Part 1," TVTechnology.com, Sep. 5, 2001 URL:http://www.tvtechnology.com/fcatures/Media-Server-Tech/f-kp-dtv3- -.html.

"SNAP2 Begins by Porting its Industry Leading In-Flight Entertainment Games to the Power TV Software Platform," SNAP2 Works with Power TV to Develop Interactive TV Content, Jun. 12, 2001 <URL:http://www.snaptwo.com/newPR50.html>.

"Sony's content Developer Portal," Creating Content for TV <URL: http://www.dpaweb.funtv.com/itv.sub.--dev.sub.--port.htm>.

"Executive Summary," Cleating Content for iTV URL:http://www.dpqweb.funtv.com/itv.sub.--exec.htm.

* cited by examiner

| KEYWORD 602 | SOURCE 604 | START TIME 606 | DURATION (SECONDS) 608 | KEY FRAME 610 | ATTRIB. 612 |
|---|---|---|---|---|---|
| BUSH | FR | 6/1/02 14:30:02 | 62.5 | YES | |
| CHICAGO | CCT | 6/1/02 14:30:04 | 120.9 | YES | |
| FOOTBALL | STT | 6/1/02 19:11:89 | 0.8 | NO | |
| CAR | SA | 6/1/02 19:11:89 | 20.2 | NO | RED |

SYSTEM AND METHOD FOR AUTOMATICALLY AUTHORING INTERACTIVE TELEVISION CONTENT

This application is a continuation of U.S. patent application Ser. No. 14/679,265, filed Apr. 6, 2015, currently pending, which is a continuation of U.S. patent application Ser. No. 14/171,276, filed Feb. 3, 2014, now U.S. Pat. No. 9,032,443 which is a continuation of U.S. patent application Ser. No. 13/270,059, filed Oct. 10, 2011, now U.S. Pat. No. 8,646,006 and is a continuation of U.S. patent application Ser. No. 10/329,753, filed Dec. 27, 2002, now U.S. Pat. No. 8,037,496, all of which are herein incorporated by reference in their entirety.

FIELD OF THE INVENTION

The invention relates generally to the field of interactive television. More specifically, the invention relates to a system and method for authoring interactive television content.

DESCRIPTION OF THE RELATED ART

Techniques for delivering interactive television (ITV) content to end users are well known in the art. For example, Metadata such as title, actor, and/or duration can be associated with movies, and users of Video on Demand (VOD) systems can select a movie for viewing at a television local to the user.

Various schemes have also been disclosed in the related art for allowing a user to select secondary content when viewing primary media content. For example, a movie chase scene may present to a user an icon for a particular brand of automobile depicted in the movie chase scene. If a user makes a selection during the display of the icon, the user is presented with secondary content in the form of advertisement for the selected brand of automobile, for instance, and the primary media content is paused. The secondary content may be in the form of a Web Page, where, for example, a Uniform Resource Locator (URL) has been associated with the icon.

Related art systems and methods for delivering ITV content have many disadvantages, however. For example, many delivery schemes begin with the assumption that secondary content has already been associated with the primary media content. In reality, there is a dearth of secondary content associated with most primary media content. In addition, the identification of secondary content, and association of the secondary content with the primary media content, are typically manual processes performed at, for example, a manual editing station. Such manual processes are time consuming and expensive. One consequence is that both primary and secondary content may not be relevant to current events. Moreover, for many content providers, manual editing is cost-prohibitive unless there is a reasonable expectation for mass market consumer appeal.

An inherent disadvantage of manual editing is that a human editor must make decisions about what portions of the primary media source might be appropriate for association with secondary content. The editor must also make decisions about the secondary content itself. Thus, the entertainment value and utility of resulting ITV products and services are highly dependent upon the skill and bias of the human editor that is authoring the ITV content.

Therefore, a need exists for a system and method for authoring ITV content without the long cycle time, high cost, and significant degree of variability associated with manual ITV content generation systems and methods.

SUMMARY OF THE INVENTION

In view of the shortcomings of related art systems and methods, one embodiment of the invention provides an application server configured to generate content for ITV products and services by automatically processing video and other primary media sources.

In one embodiment of the invention, keywords are automatically extracted from closed caption text (CCT), audio tracks, or video frames of a multimodal video source or other primary media source. In combination or in the alternative, keywords are automatically generated from shape analysis or face detection and recognition algorithms. In some embodiments of the invention, keywords are then processed according to one or more disclosed algorithms. Such processing, where applied, may advantageously narrow the quantity of downstream processing that is necessary to associate secondary sources (reference items) with the primary media source. In one respect, embodiments of the invention also provide searching methods for the identification of reference items based on the processed keywords in order to maximize the value added by the association of reference items to the primary media source.

The features and advantages of the invention will become apparent from the following drawings and detailed description.

BRIEF DESCRIPTION OF THE DRAWINGS

The invention is described with reference to the accompanying drawings, wherein.

DETAILED DESCRIPTION

Subheadings used in this section are for organizational convenience, and are not meant to indicate that the disclosure of any particular feature is limited to any particular subheading used herein.

Architecture

Figure 1:
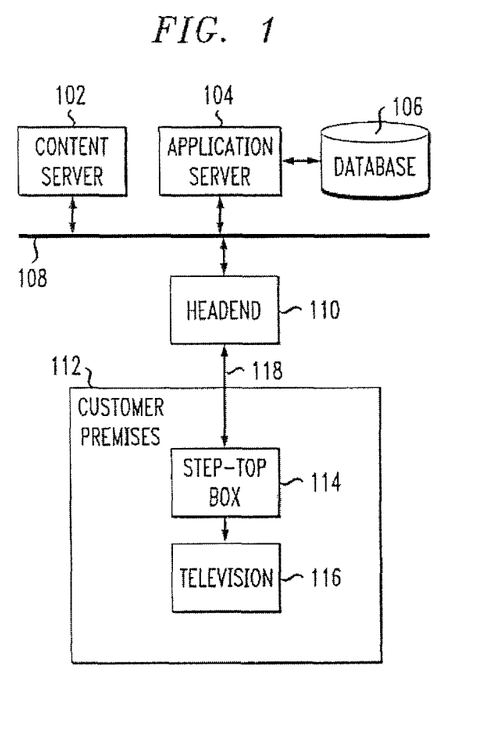
FIG. 1 is a block diagram of a system architecture, according to one embodiment of the invention.

FIG. 1 is a block diagram of a system architecture, according to one embodiment of the invention. As shown therein, a content server 102, application server 104 and headend 110 are connected via link 108. Application server 104 is additionally coupled to database 106, and headend 110 is further connected to customer premises 112. Customer premises 112 includes set-top box (STB) 114, which is connected to television (TV) 116 or other suitable presentation device.

Content server 102 is a Web server, news server, multimedia server, or other device that provides access to primary and/or secondary media sources (not shown). Primary media sources (also referenced herein as primary media content or primary content) include video presentations such as movies, newscasts or other media presentations available for download to one or more customer premises 112 via broadcast, VOD, or other delivery mechanism. Secondary sources (also referred to herein as secondary content, or references) are video, video clips, radio or other audio media, media channels, links, advertisements, teleconferences or other telephone channels, instant messaging, text-based chat rooms, audio chat rooms, or other reference items that can be associated with primary media sources and selected or delivered according to ITV processes in response to selections at customer premises 112.

Preferably, the primary and/or secondary media sources on content server 102 are made available to customer premises 112 via link 108 and headend 110. In one embodiment, content server 102 is, includes, or interfaces to, a walled garden or virtual walled garden having content secured for a single content provider. In an alternative embodiment, content server 102 hosts content in a Multiple System Operator (MSO) environment, which can be accessed by multiple content providers.

Application server 104 processes a primary video source or other primary media source, and/or searches for secondary media sources for association with the primary media source as described in detail below.

Database 106 stores keywords and/or data associated with keywords as described below. Database 106 may also store primary and/or secondary media content. In the alternative or in combination, database 106 contains links to some or all media content in content server 102. In the alternative or in combination, database 106 is or includes a directory or other index of some or all of the media content in content server 102. In one embodiment, database 106 is a set of distributed databases.

Link 108 is a wired or wireless network or other communication channel for coupling the content server 102, application server 104 and headend 110. In alternative embodiments, link 108 is or includes an intranet or an Internet using Internet Protocol (IP).

Headend 110 is a Cable Modem Termination System (CMTS), server, or other device providing an interface between content server 102 and customer premises 112. For example, in one embodiment, headend 110 is a bridge and router between IP-based link 108 and Radio-Frequency (RF) based communications link 118 terminating at STB 114. In the illustrated embodiment, headend 110 provides both broadcast and ITV services to customer premises 112. Headend 110 provides primary and/or secondary media sources to STB 114 in either analog or digital format. In one embodiment, headend 110 facilitates two-way communications with STB 114 via a Data Over Cable Services Interface Specifications (DOCSIS) compliant link to provide forward and return ITV data channels.

Customer premises 112 is a residential, business, or other fixed or mobile location for receiving primary and/or secondary media content.

In the illustrated embodiment, STB 114 functions as a network client with respect to a headend 110 server, directs content to TV 116 or other suitable presentation device, and is configured to receive selections or other commands from a user. For example, in the illustrated embodiment, STB 114 causes a menu, icon, or other presentation object to appear on a screen of TV 116, and receives a user selection at an Infrared (IR) receiver relating to at least one of the menu items, icons, or other objects presented to the user for selection. Other wireless receivers, such as a Bluetooth™ compliant receiver, may also be used. An example of a STB 114 suitable for the illustrated embodiment is the Sony model DHG-M45 set-top box. STB 114 may also be a personal computer or other device configured to process algorithms, store data, and/or output media. In such embodiments, commands, selections, or other user inputs are received via keyboard, keypad, mouse, track ball, stylus, touch screen, voice recognition utility, or other input means.

There are many alternatives to the functional architecture illustrated in FIG. 1. For instance, any one or more of the devices depicted in FIG. 1 can be implemented in multiples. Thus, in some embodiments, there may be multiple content servers 102. In addition, in some embodiments, one or more of the functional blocks in FIG. 1 are combined. For example, in embodiments where STB 114 is a personal computer or other processor having an integral display, there would not be a need for television 116 or other separate presentation device. Moreover, other communications alternatives can be used to deliver ITV content to end users at customer premises 112.

Figure 2:
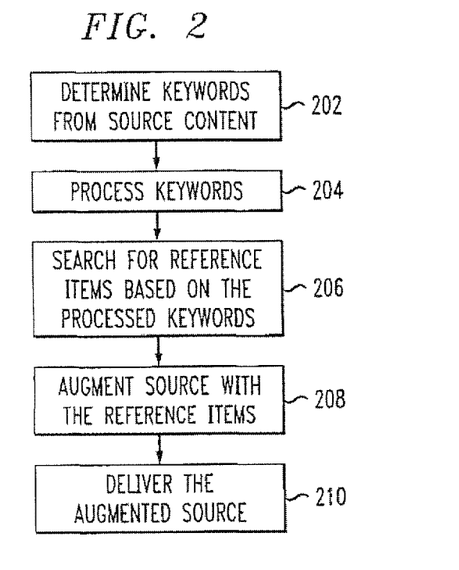
FIG. 2 is a flow diagram of an ITV process, according to one embodiment of the invention.

FIG. 2 is a flow diagram of an ITV process, according to one embodiment of the invention. The process steps illustrated in FIG. 2 are from the perspective of an architecture as a whole, and not necessarily from the perspective of any particular component(s) described with reference to FIG. 1. Moreover, the process described below with reference to FIG. 2 can be utilized in architectures vastly different from the architecture described above.

Determining Keywords

As illustrated in FIG. 2, the process begins by determining keywords from a video or other primary media source, in step 202. A keyword, as used herein, is any character, word, number, term, phrase, sentence, or similar parameter, alone or in combination with one or more other characters, words, numbers, phrases, sentences, or other term(s) that can be used as a search parameter.

Figure 3:
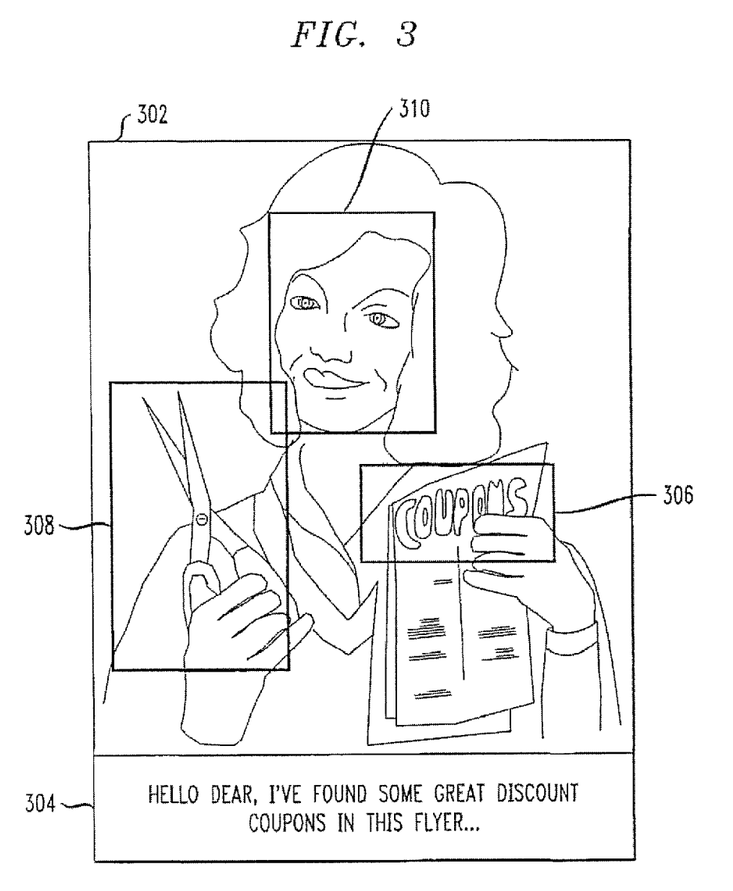
FIG. 3 is an illustration of a frame of a primary video source, according to one embodiment of the invention.

FIG. 3 illustrates that a primary media source can include a frame of video 302 having closed captioned text (CCT) information 304. Windows 306, 308, and 310 will be described below. Although not shown in FIG. 3, primary media sources may also be an audio track or include an audio track. Where the primary source is multimodal (i.e., contains more than one type of media), more than one technique is preferably used to determine keywords and/or data associated with the keywords. Accordingly, step 202 is performed using one or more processes depicted in FIG. 4.

Figure 4:
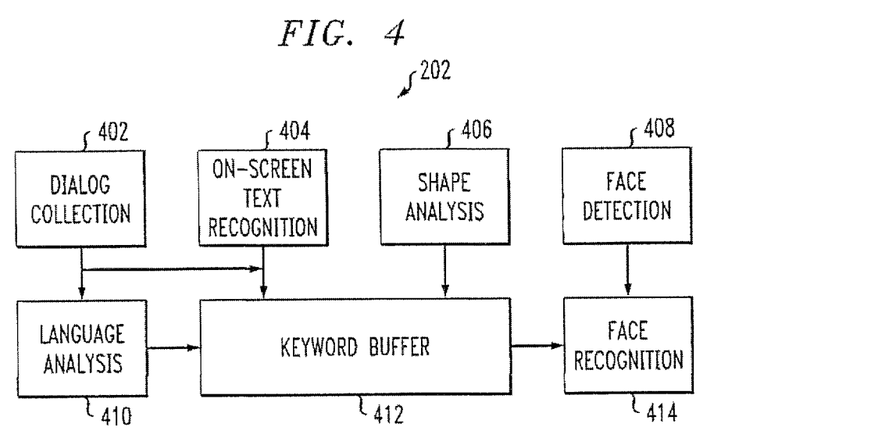
FIG. 4 is a flow diagram of a process for determining key words from a primary video source, according to one embodiment of the invention.

With reference to FIG. 4, dialog collection 402, language analysis 410, on-screen text recognition 404, shape analysis 406, face detection 408, and face recognition 414 are all processes for extracting keywords and/or data associated with keywords from a primary media source and populating keyword buffer 412 with the extracted keywords and/or data associated with the keywords. As indicated above, keyword buffer 412 may be, or may be included in, database 106.

Figure 5:
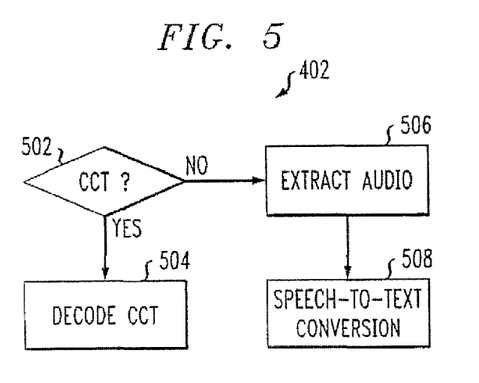
FIG. 5 is a flow diagram of a process for dialog collection, according to one embodiment of the invention.

FIG. 5 discloses one embodiment of dialog collection process 402. As shown, the process begins by determining in step 502 whether the primary media source includes CCT. If it does, the process decodes CCT in step 504 to collect dialog. For example, in one embodiment, process 504 includes extracting the CCT from a primary video source, converting the CCT to American Standard Code for Information Interchange (ASCII) characters, and removing control information such as fonts, colors, and the like. For example, with reference to FIG. 3, step 504 would extract "hello dear, I've found some great discount coupons in this flyer" as one or more keywords from CCT 304. Where step 502 determines that the primary media source does not include CCT, the process advances to step 506, where audio is extracted from the primary media source. Then, in step 508, the audio is subjected to a speech-to-text conversion. Either path generates keywords that can be loaded directly to keyword buffer 412 and/or be subjected to language analysis process 410.

Language analysis process 410 processes groups of words, phrases, and/or sentences in order to identify the most significant keyword(s) amongst those collected. In the alternative, or in combination, language analysis process 410 generates one or more keywords not selected from the group of keywords collected in process 402. For example, from words and phrases such as "inflation," "unemployment," and "gross national product" language analysis process 410 might generate the keyword "economy."

On-screen text recognition process 404 operates on one or more video frames of the primary media source to extract keywords from signage or other on-screen sources of text. For example, a video frame may show scoreboards, names of cities, names of reporters in a newscast, pricing information, or other information that can be extracted, in whole or in part, as one or more keywords. With reference to FIG. 3, on-screen text recognition process 404 could identify the on-screen text "coupons" in window 306 for extraction. ConTEXTract™ text extraction and recognition technology from SRI International® is an example of known tools for implementing on-screen text recognition process 404.

Shape analysis process 406 identifies objects contained in one or more video frames according to shape. For example, keywords such as "automobile," "pick-up truck," or "bull dozer" could be extracted from one or more video frames containing those objects. In one embodiment, shape analysis process 406 operates by matching objects within the primary media source to a library of known or expected shapes stored in database 106. For instance, with reference to FIG. 3, shape analysis process 406 might identify "scissors" in window 308 for extraction. The Virage AutoClip™ identification plug-in is one example utility that can be used to perform shape analysis process 406.

Face detection process 408 and face recognition process 414 preferably operate together to extract keywords such as name or occupation from faces that appear in one or more frames of the primary media source. For example, in one embodiment, where face detection process 408 detects a larger oval (general shape of a face) having two smaller ovals (potentially eyes) at an approximate mid-line of the larger oval, face recognition process 414 measures representative features (such as distances between the two smaller ovals) and compares ratios of those representative features to facial data in a predefined database. Where a match is found, name, occupation, or other keywords could be extracted and stored in keyword buffer 412. The Virage Face Recognition plug-in is one example of a utility that can be used to perform face detection process 408 and face recognition process 414.

Step 202 need not include all processes depicted in FIGS. 4 and 5, although step 202 preferably includes one or more processes illustrated in those drawing figures.

Figure 6:
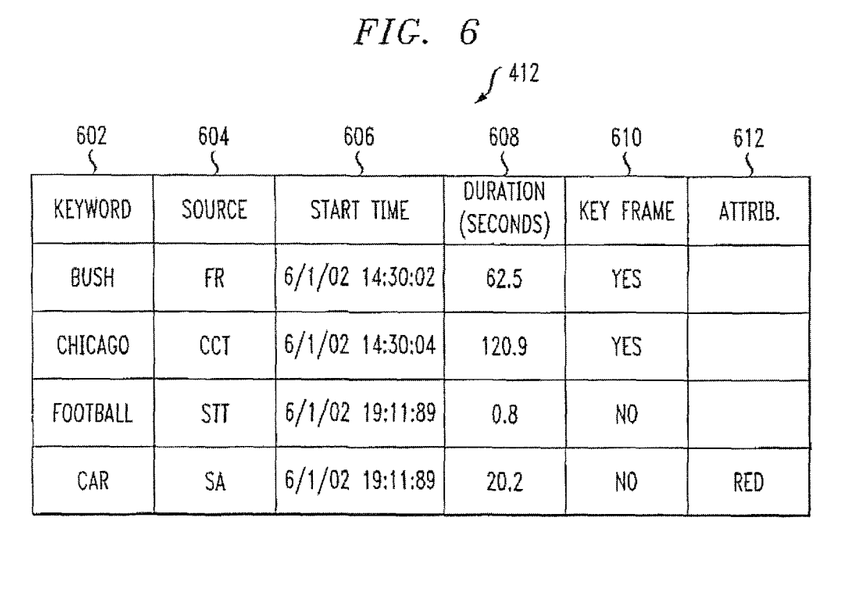
FIG. 6 is a representation of a key word buffer, according to one embodiment of the invention.

FIG. 6 is a representation of keyword buffer 412, according to one embodiment of the invention. As shown therein, keyword buffer 412 includes keywords 602 and data associated with the keywords, as determined in step 202. In the illustrated example, the data associated with keywords 602 include source 604, start time 606, duration 608, key frame 610, and keyword attribute 612. Source 604 refers to the processes in FIGS. 4 and 5. Thus, in one embodiment, FR, CCT, STT and SA refer to face recognition process 414, decode CCT step 504, speech-to-text conversion step 508, and shape analysis 406, respectively. In one embodiment, the start time 606 is a date and 24-hour time as illustrated in FIG. 6, although a frame number, Society of Motion Picture and TV Engineers (SMPTE) time code or other parameter could also be used. Where at least some frames in the primary source video have been previously designated as key frames, and where a keyword is extracted from a key frame, such information can also stored in keyword buffer 412. FIG. 6 also illustrates an example of attribute 612, where an attribute of "red" is associated with the keyword "car." Alternative embodiments store other types and combinations of data associated with the keywords.

At the conclusion of step 202, keyword buffer 412 preferably includes multiple keywords and data associated with the keywords.

Processing Keywords

As a general matter, step 204 in FIG. 2 is optional. However, to improve accuracy of the automated processing, and to reduce the required amount of downstream processing, it may be advantageous to process the keywords determined in step 202 before promoting the process to step 206. Alternative embodiments of step 204 include any one or more of the following algorithm types or their equivalents, listed here by way of example, and not by limitation:

a natural language filter, filtering out any word not found in a directory of known words of one or more predetermined languages (this would eliminate errors resulting from on-screen text recognition process 404, for example);

a noun filter, filtering out keywords that are not a person, place, or thing (e.g., a keyword of "happy" is filtered out at step 204);

a frequency counter and filter, selecting keywords that appear more times than a predetermined threshold over a predetermined period of time or other interval (e.g., where the keyword "Bush" is identified 20 times from all processes operating on the primary media source during a single scene, the keyword "Gore" is identified twice, and the predetermined threshold for any scene is 6, "Gore" is filtered out in step 204);

a unique word identifier, keeping any keyword that is unusual or atypical in the natural language (e.g., the unique word identifier may keep "cosmos" for further processing, notwithstanding infrequency of use);

scoring based on source of keyword (e.g., keywords generated from face recognition process 414 may be scored higher than keywords generated from dialog collection process 402 due to the likely importance of persons appearing in the source. Keywords can then be selected by comparing the score to a predetermined threshold);

a key frame filter, keeping only keywords that were identified in a predetermined key frame of the source media (e.g., with reference to FIG. 6, the key frame filter keeps "Bush" and "Chicago," but filters out "football" and "car");

a profile filter, keeping only those keywords that can be associated with a predetermined user profile of relevant topics;

an advertisement marker, keeping any keyword associated with an existing advertisement agreement with the content provider;

assignment of additional keyword attributes (e.g., keywords may be assigned to predetermined categories such as "current events," or they may be associated with named entity (NE) extraction data);

association of keywords in time (e.g., with reference to FIG. 6, to identify overlap or proximity in time using start time 606 and duration 608 data); and modifying one keyword with another keyword (e.g., with reference to FIG. 6, associating the car as property owned by Bush).

The output of keyword processing step 204 is preferably stored in keyword buffer 412 or other data store within database 106.

Searching for Reference Items

With reference to FIG. 2, application server 104 or other device preferably searches for reference items in step 206 based on the output of keyword processing step 204. In an alternative embodiment, step 206 operates on keywords and/or data associated with the keywords identified in step 202. In yet another embodiment, step 206 is performed based on inputs from customer premises 112. The inputs from customer premises 112 may be, for instance, keywords selected by a user from a list of keywords generated by process steps 202 and/or 204. In the alternative or in combination, the inputs from customer premises 112 may be keywords generated by a user.

Step 206 searches databases of references, links of references, or indexes of references to identify reference items. For example, step 206 can search manually-generated lists or automatically-generated indices (such as a Google™ Web search index). In addition, the references searched can range from dictionaries and encyclopedias to multimodal media. Moreover, the databases of references, links of references, or indexes may be or include public databases or private data sources (such as walled gardens).

Figure 7:
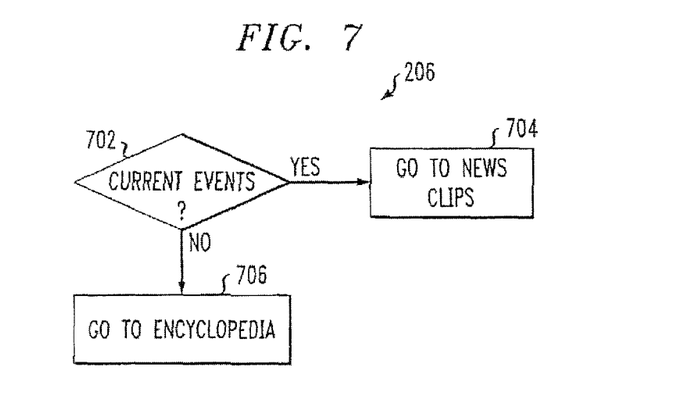
FIG. 7 is a flow diagram of a process for identifying reference items, according to one embodiment of the invention.

In the embodiment of step 206 illustrated in FIG. 7, the execution of searching step 206 depends upon whether, and how, keywords were processed in step 204. As shown therein, if it is determined in step 702 that a keyword is related to current events, then the process searches for reference items in a news clips depository in accordance with step 704. Where it is determined in step 702 that a keyword is not related to current events, the process is directed to search for reference items in an encyclopedia, in accordance with step 706. One embodiment of step 702 is executed by examining a table of current event topics.

Other embodiments of step 206 are not directly effected by whether, and how, keywords are processed in step 204. For example, in the embodiment depicted in FIG. 8, keywords are first searched against a primary reference list in step 802. If it is determined in step 804 that a number of identified reference items exceeds a predetermined threshold, then step 206 is complete. If, however, it is determined in step 804 that a number of identified reference items does not exceed a predetermined threshold, then the process may search a secondary reference list in accordance with step 806. This may be advantageous, for example, where the primary reference list is maintained by the content provider, or where use of the primary reference list generates revenue for the content provider (such as an index of advertising reference items).

Figure 8:
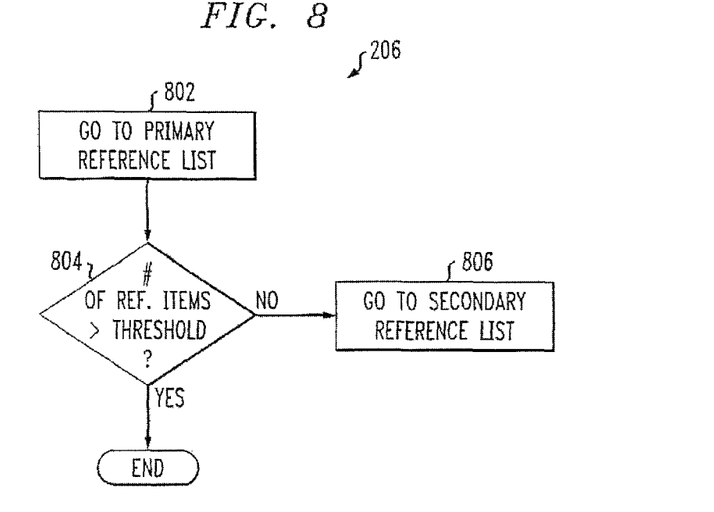
FIG. 8 is a flow diagram of a process for identifying reference items, according to one embodiment of the invention.

Step 206 can be executed using the processes illustrated in FIGS. 7 and 8 in the alternative, or in combination.

In one embodiment, step 206 searches are tailored based on geographic, demographic, or other profile data associated with the end user or class of user. For example, where a predetermined profile indicates that a user's primary language is Spanish, only databases having Spanish references, links to Spanish references or indices to Spanish references may be searched.

Alternative embodiments of the invention also differ with respect to the timing of step 206. In one embodiment, step 206 is performed in near real-time after steps 202 and/or 204. In another embodiment, previously-identified keywords and/or data associated with the keywords, which may or may not be post-processed by step 204, are used to search for reference items in step 206 according to a predetermined refresh time or interval. For example, where keywords for a given primary media source were last searched 30 days ago, step 206 may be repeated based on the previously-identified keywords in an effort to identify more current secondary content for association with the primary media source. In yet another embodiment, step 206 may be performed on demand, based on selection of a primary media source and/or keywords by a user at customer premises 112.

Augmenting and Delivering the ITV Content

In step 208, the primary media source is augmented with the reference items resulting from step 206. In one embodiment, augmentation includes embedding the reference in the primary media source. For example, data could be embedded into the vertical blanking interval (VBI) of a video signal.

In another embodiment, augmentation includes embedding, attaching, overlaying, or otherwise associating a uniform resource identifier (URI), such as a uniform resource locator (URL) or other link, with the primary media source that, when selected, will cause the reference to be displayed to the user at customer premises 112. In one embodiment, the link is to a Web page or other source having dynamic content.

In yet another embodiment, augmentation includes association of one or more interrupts that, when selected, will cause delivery of the primary media source to be stopped in favor of delivery of secondary media on the same or different channel.

The augmentation embodiments described above with reference to step 208 may be performed in the alternative or in any combination. Step 208 is alternatively performed at the application server 104, headend 110, set-top box 114 or other device.

In step 210, an augmented primary media source is delivered from content server 102, database 106, or other repository to customer premises 112 via link 108 and headend 110, or via another channel.

In one embodiment, the embedded reference items, links, and/or interrupts are filtered or otherwise personalized, for example by STB 114, based on geographic, demographic, or other profile data associated with the end user or class of user. Thus, even where, for instance, a primary media source has been augmented with 10 links to secondary sources in a particular scene, customer premises 112 may only display 3 of the 10 links to a particular user.

Video Segmentation

It may be advantageous to execute one or more of steps 202, 204, 206 and 208 according to an aggregation of frames or other interval in a video or other media source. It may be impractical, for example, to display reference items in step 210 on a per frame basis. Moreover, for some processes associated with step 202, it may be advantageous to average data across several frames to improve accuracy of the process.

Figure 9:
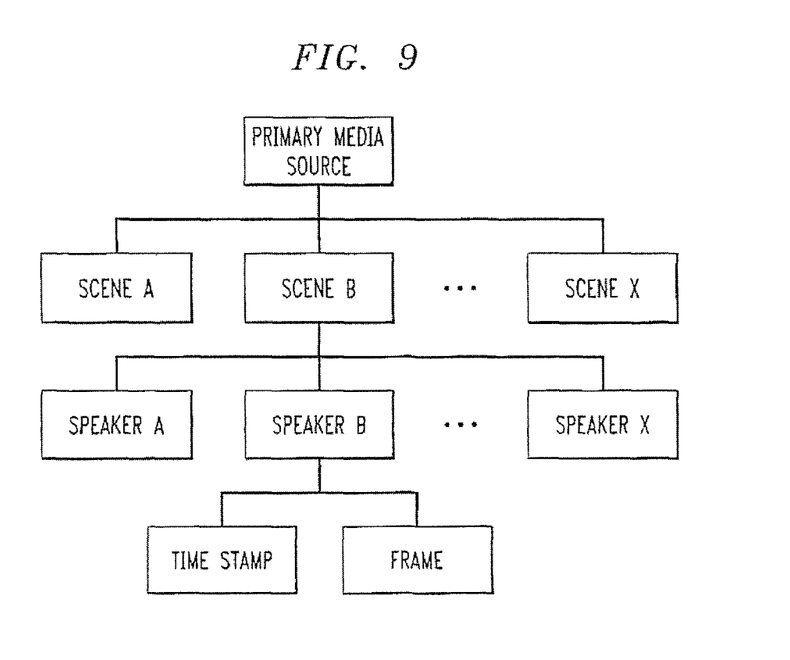
FIG. 9 is a diagram illustrating a video segmentation hierarchy, according to one embodiment of the invention.

FIG. 9 is a diagram illustrating a media segmentation hierarchy, according to one embodiment of the invention. As shown therein, a primary media source is segmented first according to scene, then according to speaker. As also shown, a speaker segmentation is further segmented either by time stamp or by frame. Scene changes can be detected, for example, by changes in background video, audio, or text derived from the multimodal primary media source.

In alternative embodiments, processing of steps 202, 204, 206 and 208 are executed, in the alternative or in combination, according to an interval of time, a key frame, or other segmentation scheme. As a general matter, each step illustrated in FIG. 2 may be executed according to a different level of media segmentation. For example, keywords could be determined in step 202 for each speaker, but augmented in step 208 according to each scene.

CONCLUSION

The invention described above thus overcomes the disadvantages of known art by providing an automatic system and method for authoring ITV content that is fast, inexpensive, and not subject to the variability of skill and bias inherent with human editors. These features enable a more primary media sources to include ITV content. In addition, embodiments of the invention facilitate a larger volume and variety of secondary content associated with the primary media source in ITV applications.

While this invention has been described in various explanatory embodiments, other embodiments and variations can be effected by a person of ordinary skill in the art without departing from the scope of the invention. Accordingly, the scope of the invention is only limited by the following claims and their known equivalents.

What is claimed is:

1. A method for delivering a media source, the method comprising:
    determining, by a processor, a first plurality of keywords from a portion of the media source, wherein the first plurality of keywords is generated from a language analysis process on words collected from the portion of the media source;
    selecting, by the processor, a second keyword from the first plurality of keywords, wherein the selecting the second keyword comprises scoring each of the first plurality of keywords based on a source of each of the first plurality of keywords, wherein the second keyword is determined based upon one or more of the first plurality of keywords that have a score above a threshold;
    searching, by the processor, a memory to identify a reference item related to the media source based upon the second keyword, wherein the reference item is external to the media source;
    filtering, by the processor, the reference item to generate a filtered reference item;
    embedding, by the processor, the filtered reference item into the media source; and
    delivering, by the processor, the media source embedded with the filtered reference item to a customer premises.

2. The method of claim 1, wherein the determining the first plurality of keywords comprises:
    determining whether the media source includes a closed caption text; decoding the closed caption text when the media source includes the closed caption text; and
    extracting an audio signal and performing a speech-to-text conversion on the audio signal that is extracted when the media source does not include the closed caption text.

3. The method of claim 1, wherein the determining the first plurality of keywords comprises performing an on-screen text recognition.

4. The method of claim 1, wherein the determining the first plurality of keywords comprises performing a shape analysis on a video frame of the media source.

5. The method of claim 1, wherein the determining the first plurality of keywords comprises:
    detecting a face on a video frame of the media source; and
    performing a face recognition on the face.

6. The method of claim 1, wherein the searching the memory is performed for each of the first plurality of keywords.

7. The method of claim 6, wherein the searching the memory comprises:
    querying a news clip directory where a keyword from the first plurality of keywords is related to a current event; and
    querying an encyclopedia where the keyword from the first plurality of keywords is not related to a current event.

8. The method of claim 6, wherein the searching the memory comprises:
    querying a primary reference list; and
    querying a secondary reference list when a quantity of the reference item does not exceed a threshold value.

9. The method of claim 1, wherein the searching the memory is performed for the second keyword.

10. The method of claim 9, wherein the searching the memory comprises:
    querying a news clip directory where the second keyword is related to a current event; and
    querying an encyclopedia where the second keyword is not related to a current event.

11. The method of claim 9, wherein the searching the memory comprises:
    querying a primary reference list; and
    querying a secondary reference list when a quantity of the reference item does not exceed a threshold value.

12. An apparatus for delivering a media source, the apparatus comprising:
    a processor; and
    a computer-readable medium storing a plurality of instructions which, when executed by the processor, cause the processor to perform operations, the operations comprising:
    determining a first plurality of keywords from a portion of the media source, wherein the first plurality of keywords is generated from a language analysis process on words collected from the portion of the media source;
    selecting a second keyword from the first plurality of keywords, wherein the selecting the second keyword comprises scoring each of the first plurality of keywords based on a source of each of the first plurality of keywords, wherein the second keyword is determined based upon one or more of the first plurality of keywords that have a score above a threshold;

searching a memory to identify a reference item related to the media source based upon the second keyword, wherein the reference item is external to the media source;

filtering the reference item to generate a filtered reference item;

embedding the filtered reference item into the media source; and delivering the media source embedded with the filtered reference item to a customer premises.

13. The apparatus of claim 12, wherein the determining the first plurality of keywords determines whether the media source includes a closed caption text, decodes the closed caption text when the media source includes the closed caption text and extracts an audio signal and performing a speech-to-text conversion on the audio signal that is extracted when the media source does not include the closed caption text.

14. The apparatus of claim 12, wherein the determining the first plurality of keywords comprises performing an on-screen text recognition.

15. The apparatus of claim 12, wherein the determining the first plurality of keywords comprises performing a shape analysis on a video frame of the media source.

16. The apparatus of claim 12, wherein the determining the first plurality of keywords detects a face on a video frame of the media source and performs a face recognition on the face.

17. The apparatus of claim 12, wherein the searching the memory queries a news clip directory where a keyword from the first plurality of keywords is related to a current event, and queries an encyclopedia where the keyword from the first plurality of keywords is not related to a current event.

18. A system for delivering a media source, the system comprising:

an interface to the media source;

an interface to a database, the database having a list of a reference item, wherein the reference item is external to the media source; and an application server in communication with the interface to the database and the interface to the media source, the application server for determining a first plurality of keywords from a portion of the media source, wherein the first plurality of keywords is generated from a language analysis process on words collected from the portion of the media source, for selecting a second keyword from the first plurality of keywords, wherein the selecting the second keyword comprises scoring each of the first plurality of keywords based on a source of each of the first plurality of keywords, wherein the second keyword is determined based upon one or more of the first plurality of keywords that have a score above a threshold, for searching the database to identify the reference item related to the media source based upon the second keyword, for filtering the reference item to generate a filtered reference item, for embedding the filtered reference item into the media source, and for delivering the media source embedded with the filtered reference item to a customer premises.

19. The system of claim 18, wherein the media source includes video information.

20. The system of claim 18, wherein the determining the first plurality of keywords comprises performing an on-screen text recognition.

\* \* \* \* \*